G. O. JOYNER AND G. J. WHITE.
CIRCULAR SAW SUPPORT.
APPLICATION FILED APR. 18, 1919.
1,327,713.
Patented Jan. 13, 1920.
2 SHEETS—SHEET 2.
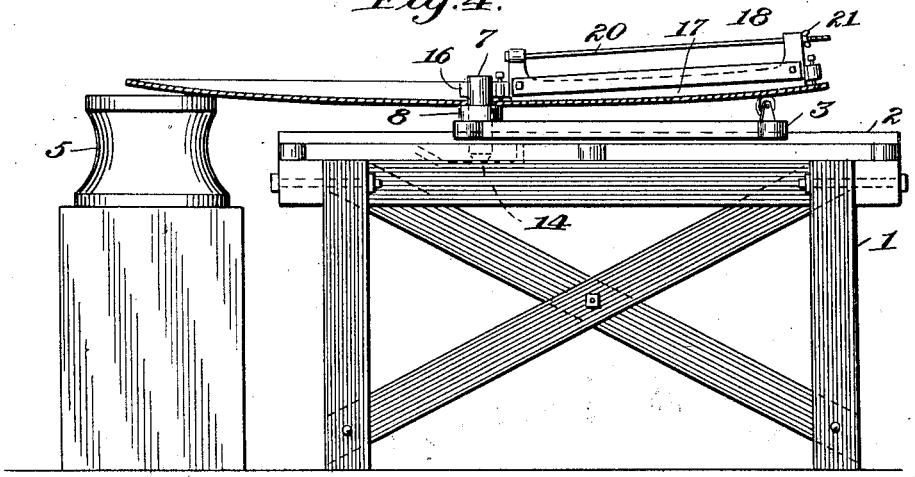
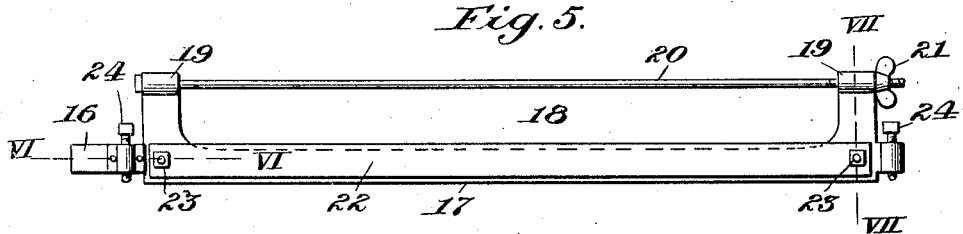
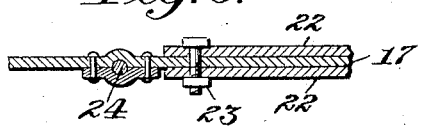
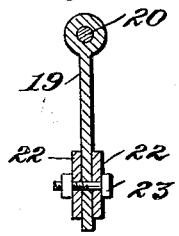
Inventors:
G. O. Joyner
G. J. White.
By Robt. P. Hains
Atty.

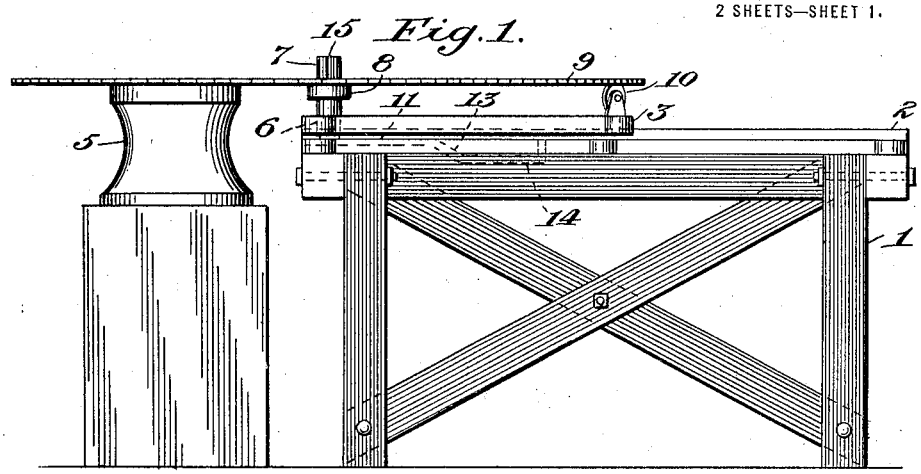
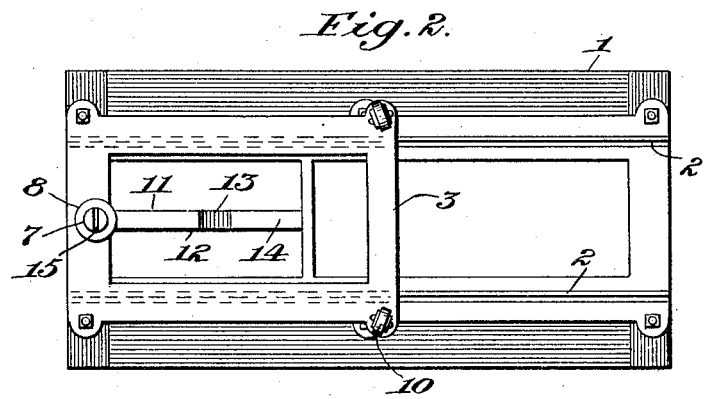
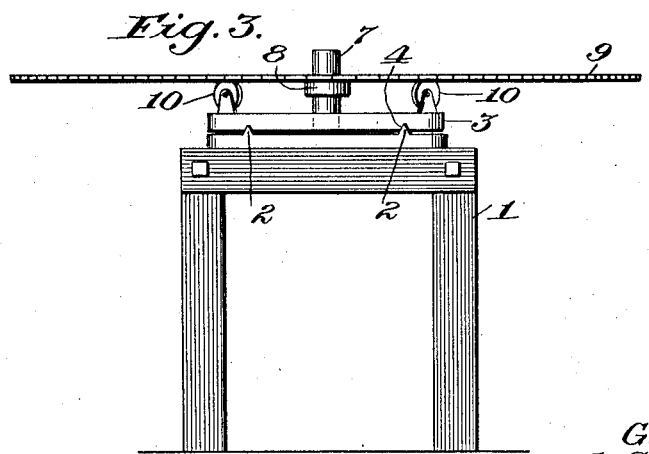

UNITED STATES PATENT OFFICE.

GEORGE O. JOYNER AND GUS J. WHITE, OF LITTLE ROCK, ARKANSAS.

CIRCULAR-SAW SUPPORT.

1,327,713.  Specification of Letters Patent.  Patented Jan. 13, 1920.

Application filed April 18, 1919. Serial No. 290,983.

*To all whom it may concern:*

Be it known that we, GEORGE O. JOYNER and GUS J. WHITE, citizens of the United States, and residents of Little Rock, in the county of Pulaski and State of Arkansas, have invented certain new and useful Improvements in Circular-Saw Supports, of which the following is a specification.

This invention relates to means for supporting or holding circular saws while being tested as to dish or curvature and also while being hammered to remove imperfections or lumps therefrom so that they will conform to the proper dish or curvature according to the speed to which they are to be revolved in use.

The invention contemplates the provision of simplified and improved means for supporting such saws adjacent an anvil so that the imperfections when found may be removed by hammering on said anvil.

It is also the object of the invention to provide means for moving the saws far enough away from the anvil to permit them to be tested as to dish as well as imperfections.

Another object is to provide improved means for testing the dish or concavity of all parts of the saws to insure them being true all around from their centers to their peripheries.

Other objects will appear as the description proceeds.

The invention will be first hereinafter described in connection with the accompanying drawings, which constitute part of this specification, and then more specifically pointed out in the claims at the end of the description.

In the accompanying drawings wherein similar reference characters are used to designate corresponding parts throughout the several views—

Figure 1 is a side elevation of a saw support constructed substantially in accordance with this invention, a circular saw being shown mounted thereon in position to be hammered on the anvil which is also illustrated in position near the supporting means for the saw.

Fig. 2 is a plan view of the saw support with the saw removed.

Fig. 3 is a front end elevation of the saw support, showing the saw in the same position as in Fig. 1.

Fig. 4 is a side elevation of the saw support and anvil, showing the saw moved back from the anvil and into position for testing its dish, the testing device or gage being also shown in operative position.

Fig. 5 is a detailed side elevation of the saw gage.

Fig. 6 is a section on the line VI—VI of Fig. 5, drawn to a larger scale; and

Fig. 7 is a section on the line VII—VII of Fig. 5, also drawn to a larger scale.

The support consists of a bench or table 1 having longitudinally extending parallel upstanding ribs 2 and a saw holding carriage 3 having grooves 4 fitting over said ribs for guiding said carriage in sliding horizontally on the table toward and away from the anvil 5. A round hole 6 is formed vertically in the front edge portion of the carriage 3 and in said hole there is loosely fitted a pin or stud 7, having a collar or annular flange 8 around its intermediate portion for supporting the central portion of a circular saw 9 when the center opening of said saw is fitted loosely over the upper end portion of the pin, as shown in Figs. 1, 3 and 4. On the rear end portion of the carriage there are mounted a plurality of rollers 10 for supporting the peripheral portion of the saw at one side of the pin 7, while the anvil supports the peripheral portion of the saw at the other or diametrically opposite side of the pin.

When the saw is in position to be hammered on the anvil, the carriage is at the front end of the table, as shown in Fig. 1, and the central portion of the saw is supported substantially in the same plane with its periphery by the pin 7, which then rests upon the upper level 11 of a bar 12, forming part of the bench or table 1. Said bar 12 has an inclined portion 13 leading to a lower level 14 on which the pin is supported when the carriage is moved back as shown in Fig. 4. As the carriage is moved back from the position shown in Fig. 1 to that shown in Fig. 4, the pin rides down the inclined portion 13 of the bar 12 and permits the central portion of the saw to drop so that the saw assumes its normal dished formation, Fig. 4, the peripheral portion of said saw being still supported on the rollers 10 and the anvil 5. While in this position, the dish of the saw and the evenness of its surface may be tested by a suitable gage, and when imperfections are found in this way the carriage is moved forward to the position shown in Fig. 1 for hammering out said imperfections on the anvil, the central portion of the saw being automatically raised to the level of its periphery by the pin 7 riding up the inclined portion 13 of the bar 12 to the upper level 11 thereof so as to bring the part to be hammered flat over the anvil. The saw may be rotated freely on the pin 7, and rollers 10, to bring any part thereof over the anvil.

The upper end portion of the pin 7, above the collar or flange 8, is formed with a diametrically arranged vertical slit 15 into which the projecting end portion 16 of a straight edge member 17 of the gage 18 is placed when the gage is to be used as illustrated in Fig. 4. When so arranged the gage and pin may be rotated to test all parts of the saw, or the gage and pin may be held stationary while the saw is rotated for the same purpose.

As illustrated in Figs. 5, 6 and 7, the gage 18 may consist of the straight edge member or bar 17, upwardly extending ears or branches 19, on the end portions and preferably integral with said member 17, an adjusting rod 20 connecting said ears and fitted with a thumb nut 21 for drawing them together to bow said member 17, as shown in Fig. 4, and a pair of strips or bars 22, pivotally connected to the opposite end portions of the member 17 at opposite sides thereof by bolts 23. When the thumb nut 21 is tightened on the rod 20 the bolts 23 serve as pivots or fulcrums for bowing the member 17, the side bars 22 insuring the uniform bowing of said member between the bolts. At the opposite ends of the gage member 17 there are provided vertically adjustable set screws 24 for lowering said member into contact with the surface of the saw or for supporting the same slightly above said surface when desired, as when a lump is found to exist in the saw and the gage is to be supported parallel to the main surface thereof so as to just touch the lump. The adjusting nut 21 is preferably arranged on the opposite end of the gage from the projection 16, so that said nut may be easily reached at the edge of the saw for varying the bow or curve of the member 17.

Having thus fully described our invention, what we claim as new and desire to secure by Letters Patent of the United States is—

1. In a saw support of the character described, the combination with a horizontally movable carriage, of means thereon for supporting the central portion of a circular saw, and means for automatically moving said central portion of the saw vertically during the horizontal movement of the carriage.

2. In a saw support of the character described, the combination with a horizontally movable carriage, of a vertically movable pin on the carriage for supporting the central portion of a circular saw, and means for automatically moving said pin and central portion of the saw vertically as the carriage is moved horizontally.

3. In a saw support of the character described, the combination with a horizontally movable carriage, of a vertically movable pin on the carriage, a collar on said pin for supporting the central portion of a circular saw thereon, and means for automatically moving said pin vertically as the carriage is moved horizontally.

4. In a saw support of the character described, the combination with a horizontally movable carriage, of a vertically movable pin on the carriage for supporting the central portion of a circular saw, and a fixed member arranged below the pin and having portions on different levels and an inclined portion leading from one level to the other for automatically moving said pin vertically as it travels over said member during the horizontal movement of the carriage.

5. In a saw support of the character described, the combination with a table, of a carriage movable vertically thereon, a pin vertically movable through the carriage, means on the upper end of the pin for supporting the central portion of a circular saw thereon, and a member mounted on the table and extending below the pin along the path of said pin during the movement of the carriage, said member having portions at different levels and an inclined portion connecting one level with the other for the purpose specified.

6. In a saw support, the combination with a horizontally movable carriage, of means for supporting the peripheral portion of a circular saw, means on the carriage for supporting the central portion of said saw, and means for automatically moving said central portion of the saw vertically during the horizontal movement of the carriage and while the peripheral portion of the saw remains on its original level.

7. In a saw support, the combination with a horizontally movable carriage, of means fixed against vertical movement thereon for supporting the peripheral portion of a circular saw, a vertically movable pin on the carriage for supporting the central portion of the saw, and means for automatically moving said pin and central portion of the saw vertically during the horizontal movement of the carriage and while the peripheral portion of the saw remains on its original level.

GEO. O. JOYNER.
GUS J. WHITE.